United States Patent Office 2,773,874
Patented Dec. 11, 1956

2,773,874

STABILIZATION OF POLYMERIZABLE HETEROCYCLIC NITROGEN COMPOUNDS

Paul S. Hudson, Mack F. Potts, and Warren L. Smith, Bartlesville, Okla., assignors to Phillips Petroleum Company, a corporation of Delaware No Drawing. Application November 7, 1952,
Serial No. 319,414

16 Claims. (Cl. 260—290)

This invention relates to the stabilization of polymerizable materials. In one aspect it relates to the stabilization of polymerizable heterocyclic nitrogen compounds during storage, distillation, and at elevated temperatures. In another aspect, it relates to a method for preventing loss of heterocyclic nitrogen compounds due to polymerization.

It is well known that unsaturated, polymerizable heterocyclic nitrogen compounds tend to polymerize during storage and when subjected to various handling conditions, especially during distillation, and consequently yields and recovery of these compounds are often diminished as a result. In addition to the disadvantage of reduced yield due to polymerization, the polymerized material often adversely affects the reactions wherein these polymerizable compounds are employed as reactants, as well as, the products which are derived from these reactions.

The following objects will be obtained by the aspects of this invention:
It is an object of this invention to provide a method for inhibiting the polymerization of polymerizable heterocyclic nitrogen compounds during storage and other handling conditions. It is another object to inhibit polymerization of these materials at elevated temperatures and during distillation. It is still another object to provide polymerization inhibited compositions comprising polymerizable heterocyclic nitrogen compounds. It is still another object to provide a process for inhibiting the polymerization of vinyl-substituted pyridines. It is still another object to provide a polymerization inhibited composition comprising a vinyl-substituted pyridine. Other objects of this invention will be apparent to those skilled in the art upon reading the disclosure of this invention.

We have discovered that ammonium N-nitrosophenylhydroxylamine and certain derivatives of ammonium N-nitrosophenylhydroxylamine are very effective stabilizers or polymerization inhibitors for polymerizable heterocyclic nitrogen compounds, for example, vinyl-substituted heterocyclic nitrogen compounds.

Ammonium N-nitrosophenylhydroxylamine is preferred, however derivatives which are applicable are characterized by the structural formula

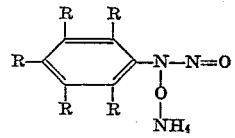

wherein at least 2 R's are hydrogen and the remaining R's are selected from the group consisting of hydrogen, halogen, nitro, amino, hydroxy, methoxy, ethoxy, and alkyl groups, and the total number of carbon atoms in the alkyl groups are not greater than 12. The following compounds are illustrative of the materials which can be employed: ammonium N-nitroso-4-methylphenylhydroxylamine, ammonium N-nitroso-2,6-dinitrophenylhydroxylamine, ammonium N-nitroso-2-hydroxy-4-chlorophenylhydroxylamine, ammonium N-nitroso-2,6-dinitro-4-chlorophenylhydroxylamine, ammonium N-nitroso-2-methoxy-4-aminophenylhydroxylamine, and ammonium N-nitroso-3-ethoxyphenylhydroxylamine.

Ammonium N-nitrosophenylhydroxylamine is prepared by passing ammonia gas into an ethereal solution of phenylhydroxylamine and n-butyl nitrite at about 10° C. and atmospheric pressure. The yield of ammonium N-nitrosophenylhydroxylamine is about 85 to 95 percent of theoretical. The derivatives of ammonium N-nitrosophenylhydroxylamine which are applicable in the process of this invention are prepared by reacting the selected phenylhydroxylamine derivative in the above manner. Thus ammonium N-nitroso-2-methyl-6-nitrophenylhydroxylamine is prepared by passing ammonia gas into an ethereal solution of 2-methyl-6-nitrophenylhydroxylamine and n-butyl nitrite at about 10° C. and atmospheric pressure. This procedure is used to prepare other derivatives applicable in the process of this invention.

Ammonium N-nitrosophenylhydroxylamine and derivatives herein described are effective stabilizers for vinylpyridines at elevated temperatures, e. g., at temperatures up to around 400° F., as well as at room temperature, to retard polymerization of the vinylpyridine during distillation as well as during storage and shipment. These stabilizing agents are effective in anhydrous systems as well as in systems where water is present.

The amount of stabilizing agent used in any particular instance will depend upon the vinylpyridine compound being stabilized and the time and temperature under which it is desired to effect stabilization. The amount is usually in the range between about 0.001 and about 5.0 percent, preferably in the range between about 0.05 and about 1.0 percent, and more preferably in the range between about 0.1 and about 0.5 percent, based upon the weight of the vinylpyridine compound employed. Larger amounts of stabilizing agent can be used if desired although it is generally not considered necessary. The ammonium salts of N-nitrosophenylhydroxylamines are in general only slightly soluble in the vinylpyridine compounds. They are generally added as fine powders and the mixture is stirred and/or warmed.

After storage or shipment of the stabilized material the vinylpyridine compound can be readily separated and recovered from the stabilizing agent by distillation, preferably in vacuo, or in any other convenient manner.

Preferred polymerizable heterocyclic nitrogen compounds which can be stabilized in accordance with our invention are the mono- and divinylpyridines, with the vinyl group being present in any of the several positions in the pyridine nucleus. Alkyl groups can be present on the ring or on the alpha carbon atom of the vinyl group, but the number of carbon atoms in the combined alkyl groups should generally not be greater than 12. These alkyl groups are preferable methyl and ethyl groups. These preferred vinylpyridine compounds have the structural formula:

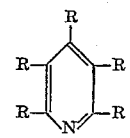

where R is selected from the group consisting of hydrogen, alkyl, vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 4-vinylpyridine; 2,5-divinylpyridine; 2-methyl-5-vinylpyridine; 2-vinyl-5-ethylpyridine; 2,3,4-trimethyl-5-vinylpyridine; 3,-

4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5-(alpha-methylvinyl) pyridine; 2-(alpha-methylvinyl) pyridine; 3,5-di(alpha-methylvinyl) pyridine; and the like.

The above compounds substituted with non-interfering groups such as halo- and nitro-, are applicable in this invention.

Other polymerizable heterocyclic nitrogen compounds which can be used in the practice of this invention include those vinyl and alpha-methylvinyl substituted heterocyclic nitrogen compounds in which the ring structure is unsaturated, partially saturated and completely saturated. Examples include vinyl and alpha-methylvinyl substituted quinolines, isoquinolines, piperidines (hexahydropyridines), pyrroles, pyrrolidines, pyrrolidones, especially the vinyl-substituted pyrrolidones, piperidines, pyrroles, pyrrolidines, quinolines, isoquinolines, dihydro and tetrahydropyridines, partially hydrogenated quinolines and isoquinolines, and pyrrolines (dihydropyrroles) and alkyl derivatives of the foregoing compounds. Examples of such compounds are 2-vinylquinolines; 8-ethyl-2-vinylquinoline; 4-hexyl-5-vinylquinoline; 1-vinylisoquinoline, 5-methyl-1-isopropenylisoquinoline; 1,8-divinylisoquinoline; N-vinylpyrrolidone; 3-vinyl-pyrrolidone; N-vinylpyrrole; 4-vinylpyrrole; 2-vinylpiperidine, N-vinylpyrrolidine; 3-vinylpyrrolidine; N-vinylcarbazole; and 5-vinylcarbazole and the like.

The following examples are illustrative of this invention and show comparative results and improvements obtained by this invention:

*Example I*

A run using ammonium N-nitrosophenylhydroxylamine (cupferron) as an inhibitor for the polymerization of 2-methyl-5-vinylpyridine was made by adding 0.3 percent by weight of this compound to 2-methyl-5-vinylpyridine and heating the mixture in an atmosphere of nitrogen for 24 hours at 185° F. The unreacted 2-methyl-5-vinylpyridine was removed by vacuum distillation at a pressure less than 1 mm. Hg. The polymer which remained was weighed and the percent 2-methyl-5-vinylpyridine polymerized was calculated. A similar run was made in which no additive was present. The following results were obtained:

| Additive | Percent 2-Methyl-5-Vinylpyridine Polymerized |
|---|---|
| Cupferron | 1.25 |
| None | 23.0 |

*Example II*

A run was made similar to those described in Example I using a sample of 2-methyl-5-vinylpyridine containing 5 percent by weight of water. The result is as follows:

| Additive | Percent 2-Methyl-5-Vinylpyridine Polymerized |
|---|---|
| Cupferron | 1.14 |

*Example III*

The procedure of Example I was used in a run using ammonium N-nitrosophenylhydroxylamine (cupferron) as a stabilizing agent for 2-methyl-5-vinyl-pyridine except that the mixture was heated in an atmosphere of nitrogen for 24 hours at 200° F. instead of at 185° F. The result was as follows:

| Additive | Percent 2-Methyl-5-Vinylpyridine Polymerized |
|---|---|
| Cupferron | 1.59 |

Variations and modifications are possible within the scope of the disclosure of the present invention, the essence of which is that ammonium N-nitrosophenylhydroxylamine and certain derivatives thereof have been found to be polymerization inhibitors for vinyl substituted heterocyclic nitrogen compounds.

We claim:
1. A method for inhibiting the polymerization of compounds selected from the class of vinyl substituted pyridines having the structural formula

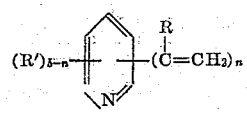

where $n$ is an integer selected from the group consisting of 1 and 2, R is selected from the group consisting of H and CH₃, and R' is selected from the group consisting of H and alkyl groups, not more than 12 carbon atoms being present in the total of said R' groups; which comprises adding to said compound a polymerization inhibiting amount of a compound selected from the group consisting of ammonium N-nitrosophenylhydroxylamine, ammonium N-nitroso-4-methylphenylhydroxylamine, ammonium N-nitroso-2,6-dinitrophenylhydroxylamine, ammonium N-nitroso-2-hydroxy-4-chlorophenylhydroxylamine, ammonium N-nitroso-2,6-dinitro-4-chlorophenylhydroxylamine, ammonium N-nitroso-2-methoxy-4-aminophenylhydroxylamine, and ammonium N-nitroso-3-ethoxyphenylhydroxylamine.

2. A method for inhibiting the polymerization of compounds selected from the class of vinyl substituted pyridines having the structural formula

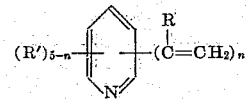

where $n$ is an integer selected from the group consisting of 1 and 2, R is selected from the group consisting of H and CH₃, and R' is selected from the group consisting of H and alkyl groups, not more than 12 carbon atoms being present in the total of said R' groups; which comprises adding to said pyridines at least 0.001 weight percent of a stabilizing agent selected from the group consisting of ammonium N-nitrosophenylhydroxylamine, ammonium N-nitroso-4-methylphenylhydroxylamine, ammonium N-nitroso-2,6-dinitrophenylhydroxylamine, ammonium N-nitroso-2-hydroxy-4-chlorophenylhydroxylamine, ammonium N-nitroso-2,6-dinitro-4-chlorophenylhydroxylamine, ammonium N-nitroso-2-methoxy-4-aminophenylhydroxylamine, and ammonium N-nitroso-3-ethoxyphenylhydroxylamine.

3. A composition comprising a vinyl substituted pyridine selected from the class having the structural formula

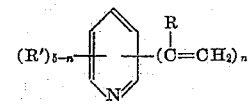

where $n$ is an integer selected from the group consisting of 1 and 2, R is selected from the group consisting of H and CH₃, and R' is selected from the group consisting of H and alkyl groups, not more than 12 carbon atoms being present in the total of said R' groups; having a polymerization inhibiting amount of a compound selected from the group consisting of ammonium N-nitrosophenylhydroxylamine, ammonium N-nitroso-4-methylphenylhydroxylamine, ammonium N-nitroso-2,6-dinitrophenylhydroxylamine, ammonium N-nitroso-2-hydroxy-4-chlorophenylhydroxylamine, ammonium N-nitroso-2,6-dinitro-4-chlorophenylhydroxylamine, ammonium N-nitroso-2-methoxy-4-aminophenylhydroxylamine, and ammonium N-nitroso-3-ethoxyphenylhydroxylamine.

4. A composition comprising a vinyl substituted pyridine selected from the class having the structural formula

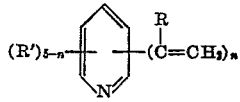

where $n$ is an integer selected from the group consisting of 1 and 2, R is selected from the group consisting of H and CH₃, and R' is selected from the group consisting of H and alkyl groups, not more than 12 carbon atoms being present in the total of said R' groups; and at least 0.001 weight percent of a stabilizing agent selected from the group consisting of ammonium N-nitrosophenylhydroxylamine, ammonium N-nitroso-4-methylphenylhydroxylamine, ammonium N-nitroso-2,6-dinitrophenylhydroxylamine, ammonium N-nitroso-2-hydroxy-4-chlorophenylhydroxylamine, ammonium N-nitroso-2,6-dinitro-4-chlorophenylhydroxylamine, ammonium N-nitroso-2-methoxy-4-aminophenylhydroxylamine, and ammonium N-nitroso-3-ethoxyphenylhydroxylamine.

5. The composition of claim 4 wherein the vinyl compound is 2-vinylpyridine.

6. The composition of claim 4 wherein the vinyl compound is 2-vinyl-5-ethylpyridine.

7. The composition of claim 4 wherein the vinyl compound is 4-vinylpyridine.

8. The composition of claim 4 wherein the vinyl compound is 2-(alpha-methylvinyl) pyridine.

9. The composition of claim 4 wherein the polymerization inhibiting compound is ammonium N-nitrosophenylhydroxylamine.

10. The process of claim 2 wherein the polymerization inhibiting compound is ammonium N-nitroso-2-methyl-6-nitrophenylhydroxylamine.

11. The process of claim 2 wherein the polymerization inhibiting compound is ammonium N-nitroso-4-methylphenylhydroxylamine.

12. The process of claim 2 wherein the polymerization inhibiting compound is ammonium N-nitroso-2-hydroxy-4-chlorophenylhydroxylamine.

13. The process of claim 2 wherein the polymerization inhibiting compound is ammonium N-nitroso-2,6-dinitrophenylhydroxylamine.

14. A method for inhibiting the polymerization of 2-methyl-5-vinylpyridine which comprises adding to said vinylpyridine at least about 0.001 weight percent of ammonium N-nitrosophenylhydroxylamine.

15. A composition comprising 2-methyl-5-vinylpyridine and at least about 0.001 weight percent of ammonium N-nitrosophenylhydroxylamine.

16. A composition comprising 2-methyl-5-vinylpyridine and from about 0.001 to about 5.0 weight percent of ammonium N-nitrosophenylhydroxylamine.

References Cited in the file of this patent

UNITED STATES PATENTS 2,556,845    Kauffman _____ June 12, 1951

OTHER REFERENCES

Tuzuki et al.: Chem. Abst., vol. 35, col. 3243 (1941).